(12) United States Patent
Sharma et al.

(10) Patent No.: US 11,051,211 B2
(45) Date of Patent: Jun. 29, 2021

(54) METHOD AND SYSTEM FOR MANAGING 4G-5G INTER-NETWORK SWITCHING

(71) Applicant: Samsung Electronics Co., Ltd., Gyeonggi-do (KR)

(72) Inventors: Neha Sharma, Bangalore (IN); Nitesh Pushpak Shah, Bangalore (IN); Veeresh Kumar Pinni Pedda, Bangalore (IN); Arun Mahajan, Bangalore (IN); Vikrant Bajaj, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/500,614

(22) PCT Filed: Apr. 13, 2018

(86) PCT No.: PCT/KR2018/004364
§ 371 (c)(1),
(2) Date: Oct. 3, 2019

(87) PCT Pub. No.: WO2018/190689
PCT Pub. Date: Oct. 18, 2018

(65) Prior Publication Data
US 2020/0196199 A1 Jun. 18, 2020

(30) Foreign Application Priority Data

Apr. 13, 2017 (IN) .................... 201741013341 PS
Apr. 11, 2018 (IN) .................... 201741013341 CS

(51) Int. Cl.
*H04W 36/00* (2009.01)
*H04W 76/16* (2018.01)
(Continued)

(52) U.S. Cl.
CPC ....... *H04W 36/0016* (2013.01); *H04L 1/1628* (2013.01); *H04W 36/0079* (2018.08);
(Continued)

(58) Field of Classification Search
CPC ............. H04W 36/0016; H04W 76/16; H04W 36/0079; H04W 36/14; H04W 48/16;
(Continued)

(56) References Cited

U.S. PATENT DOCUMENTS

| 8,140,075 B2 | 3/2012 | Watanabe |
| 2012/0028661 A1 | 2/2012 | Fang et al. |

(Continued)

FOREIGN PATENT DOCUMENTS

| EP | 03104641 | 12/2016 |
| EP | 3280218 | 2/2018 |

OTHER PUBLICATIONS

PCT/ISA/210 Search Report issued on PCT/KR2018/004364, pp. 3.
(Continued)

*Primary Examiner* — Harry H Kim
(74) *Attorney, Agent, or Firm* — The Farrell Law Firm, P.C.

(57) ABSTRACT

Accordingly, embodiments disclosed herein provide a method for managing inter network switching by a User Equipment (UE) in a wireless communication system. The method includes determining that the UE is in data communication with a first network, determining that a signaling packet data network (PDN) is established for transmitting a Link Switch Message (LSM) for the inter network switching during the data communication with the first network, ignoring to perform a search for a second network until the signaling PDN is established for the first network and establishing the signaling PDN for the first network. Further it provides the method for detecting the condition of retrans- (Continued)

mission of LSM and provides method to avoid data loss and signaling overhead during inter-network switching.

8 Claims, 7 Drawing Sheets

(51) Int. Cl.
| | |
|---|---|
| H04W 36/14 | (2009.01) |
| H04W 48/16 | (2009.01) |
| H04W 48/18 | (2009.01) |
| H04W 88/06 | (2009.01) |
| H04W 36/02 | (2009.01) |
| H04L 1/16 | (2006.01) |

(52) U.S. Cl.
CPC ........... *H04W 36/14* (2013.01); *H04W 48/16* (2013.01); *H04W 48/18* (2013.01); *H04W 76/16* (2018.02); *H04W 88/06* (2013.01)

(58) Field of Classification Search
CPC . H04W 48/18; H04W 88/06; H04W 36/0005; H04W 36/023; H04L 1/1628
See application file for complete search history.

(56) References Cited

U.S. PATENT DOCUMENTS

| | | | |
|---|---|---|---|
| 2013/0130738 A1* | 5/2013 | Cherian | H04W 36/0083 455/522 |
| 2015/0215805 A1 | 7/2015 | Lee et al. | |
| 2016/0157147 A1* | 6/2016 | Saghir | H04W 36/04 455/444 |
| 2017/0048739 A1* | 2/2017 | Jeong | H04W 48/18 |
| 2017/0289019 A1* | 10/2017 | Faccin | H04W 36/0066 |
| 2017/0289879 A1* | 10/2017 | Wang | H04W 76/27 |
| 2018/0270809 A1* | 9/2018 | Park | H04W 72/048 |

OTHER PUBLICATIONS

PCT/ISA/237 Written Opinion issued on PCT/KR2018/004364, pp. 4.

Lee, Sungwon, "Open-source Wireless Switch for Experimental Research Vitalization for B4G/5G Networks", Copyright 2014 IEEE, Jul. 8, 2014, pp. 4.

* cited by examiner

[Fig. 4]
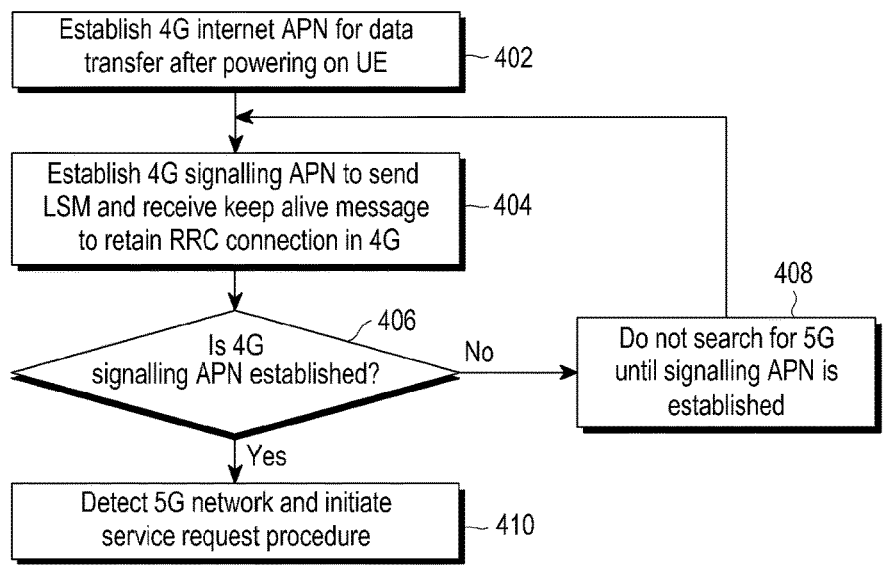
[Fig. 5]
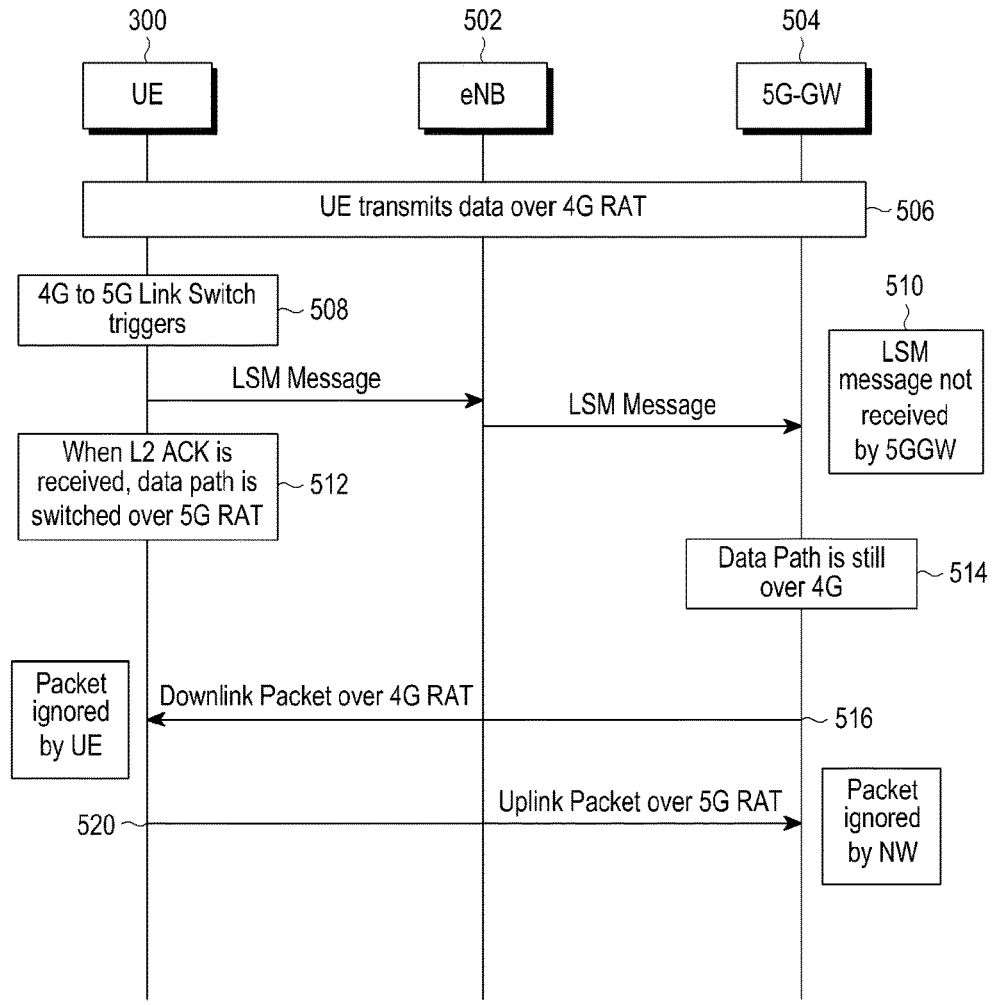

[Fig. 6]
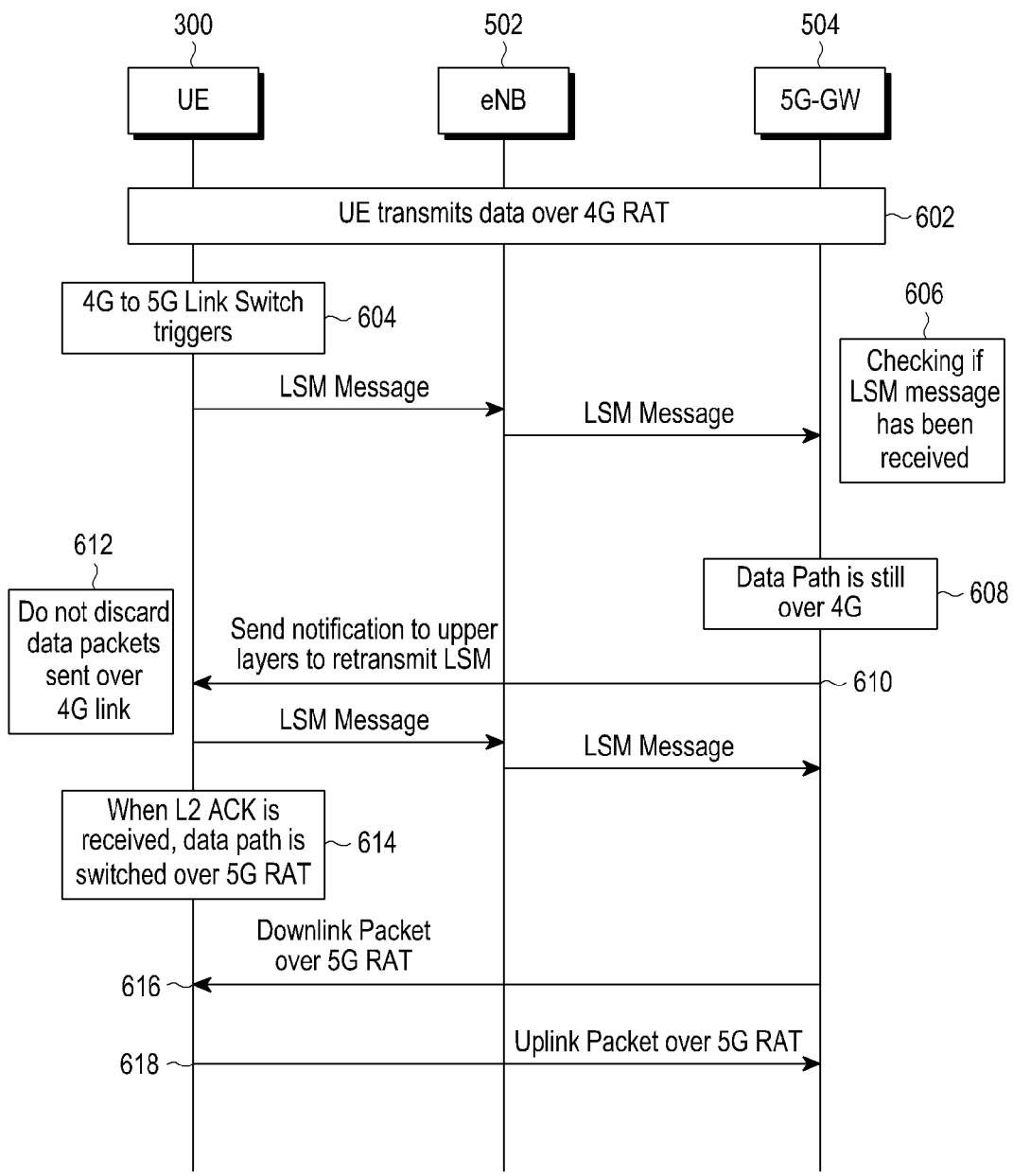

[Fig. 7]
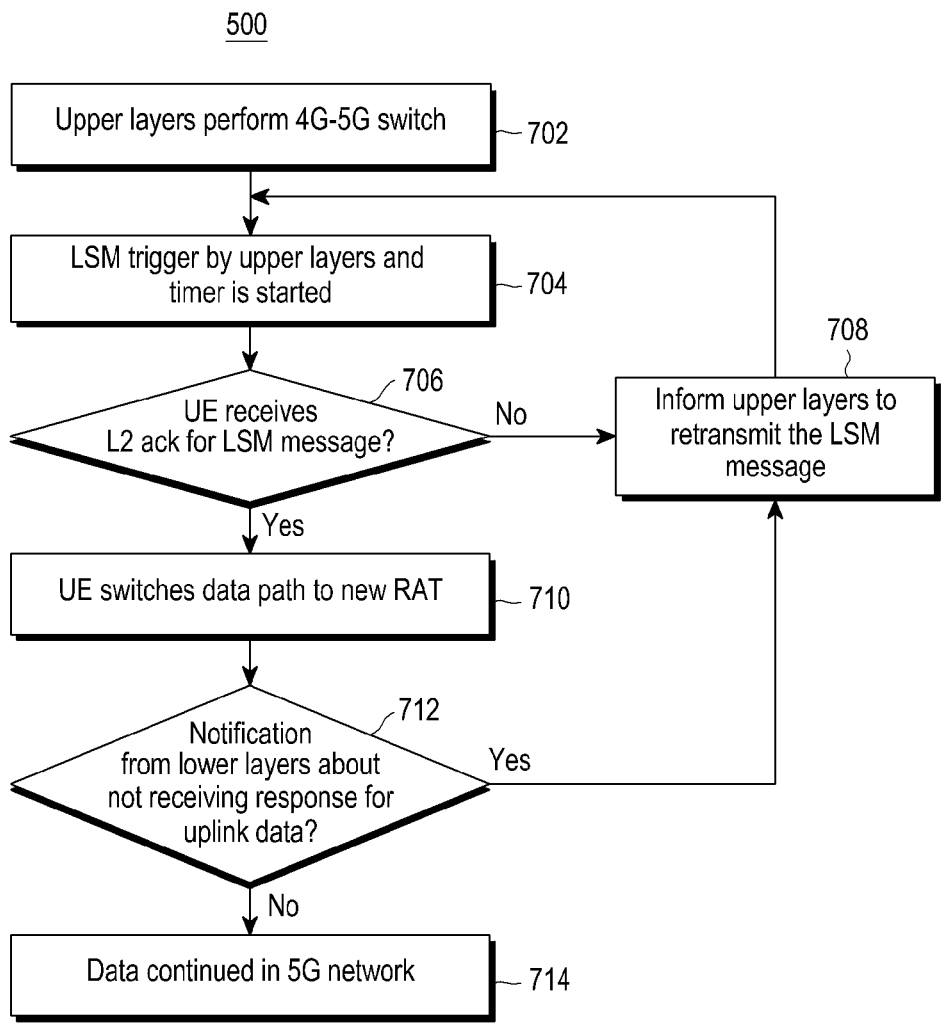

[Fig. 8]
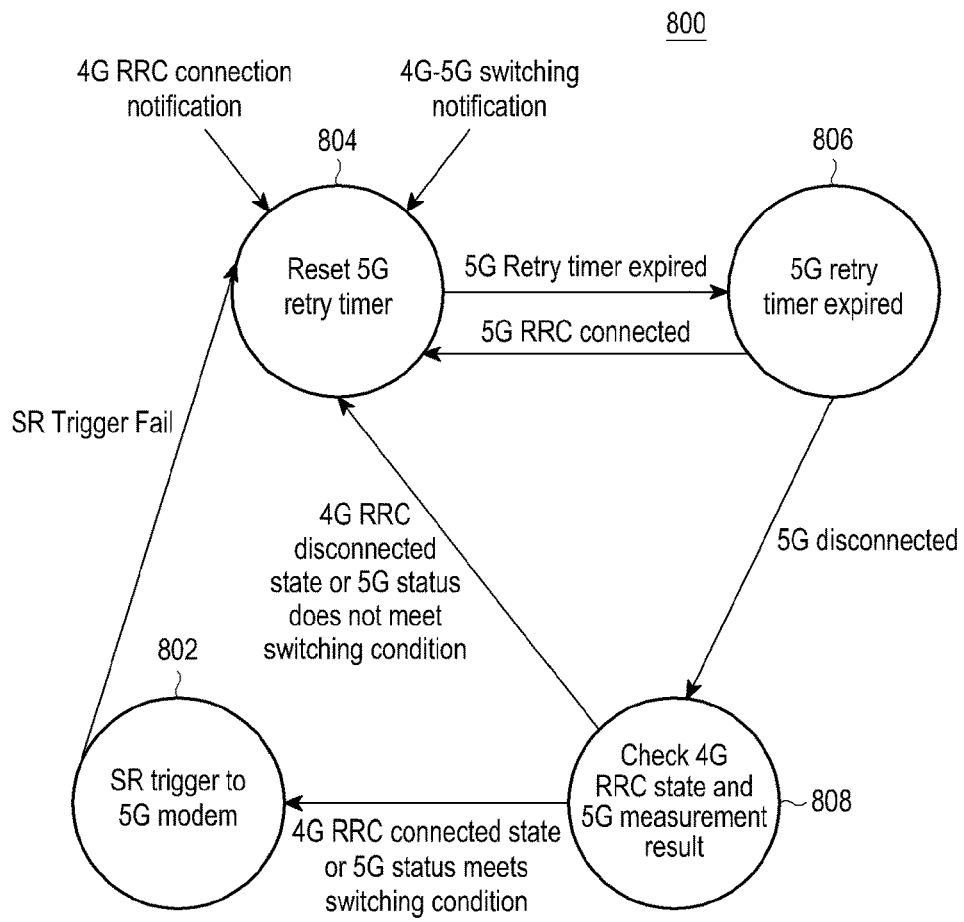
[Fig. 9]
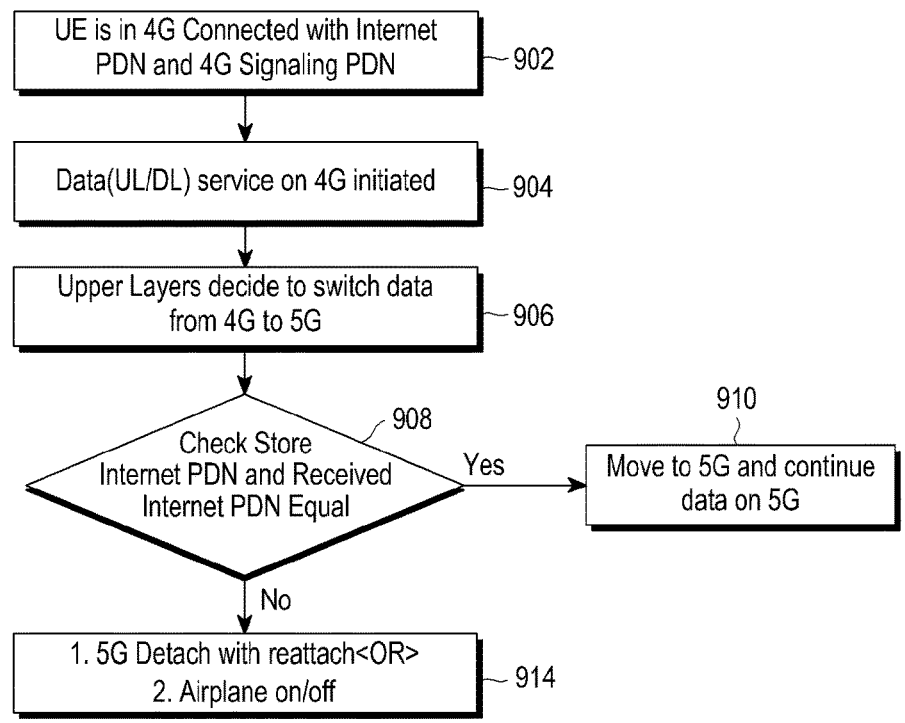

[Fig. 10]
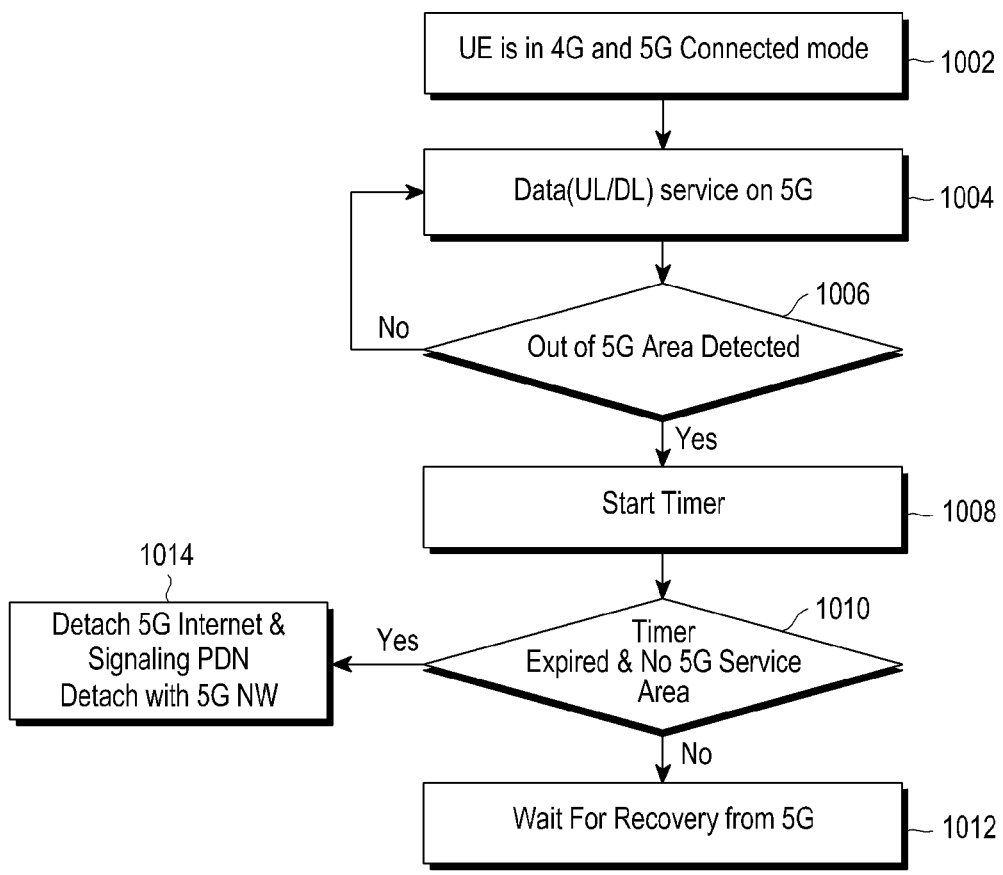

METHOD AND SYSTEM FOR MANAGING 4G-5G INTER-NETWORK SWITCHING

PRIORITY

This application is a National Phase Entry of International Application No. PCT/KR2018/004364, which was filed on Apr. 13, 2018, and claims priority to Indian Provisional Patent Application No. 201741013341 (PS) and Indian Complete Patent Application No. 201741013341 (CS), which were filed on Apr. 13, 2017 and Apr. 11, 2018, respectively, the content of each of which is incorporated herein by reference.

TECHNICAL FIELD

The embodiments herein relate to in general to inter-network switching for 4G-5G networks and more particularly to a method and system to manage data and control plane issues in a 4G-5G network switching. The present application is based on, and claims priority from an Indian Application Number 201741013341 filed on 13th Apr., 2017, the disclosure of which is hereby incorporated by reference herein.

BACKGROUND ART

The 3$^{rd}$ Generation Partnership Project (3GPP) specification TS 38.804 defines possible deployment scenarios in terms of cell layout and Node B locations where both New RAT (NR) and Long Term Evolution (LTE) coverage exists.

FIG. 1 is prior art that illustrates a homogenous deployment of overlaid LTE and NR cells. LTE serves macro cells and NR serves small cells. The opposite scenario is also considered. A co-located cell refers to a small cell together with a macro cell for which an eNodeB (eNB) is installed at the same location. A non-co-located cell refers to a small cell together with a macro cell for which an eNB is installed at the different location.

This kind of deployment can work in two modes, i.e., a Standalone Mode (SA) and a Non-Standalone Mode (NSA). The SA method is a method in which the 5G network communicates with the 5G terminal independently and can be interworked with existing 2G/3G/4G legacy network by the IRAT interworking method. This is generally similar to the operation of existing 2G/3G/4G. The NSA method is a method in which the 5G network does not operate independently but operates as an auxiliary system of the 4G NW. That is, the terminal basically is connected to the 4G network to operate the communication service, and connects to the 5G network as required according to the control of the 4G NW. In case of the NSA method, the control plane uses 4G and the user plane (user data) can use both 4G and 5G simultaneously. The Non-Standalone mode concept is the same as LTE dual connectivity where one RAT acts as a master node and another RAT acts as a slave node.

LTE or 4G Network system is well deployed and stable as compared to 5G system which is under trial or under discussion. To support initial trials of the 5G system, the availability of 4G services for few functionalities like paging as current 5G system are still under discussion and also 5G is not well deployed so to solve mobility issues 4G system support is mandatory as without that user cannot have good experience in terms of services. In the SA system 4G and 5G network are configured and operated independently. For this to work new system is required in place which caters the requirements of 5G system.

FIG. 2 illustrates a 4G-5G interworking architecture, according to prior art as disclosed herein. For 4G-5G interworking, the UE supports both LTE and 5G. When the terminal is powered on, the terminal searches for a 4G network and performs 4G attach and packet data network (PDN) connection procedures. In case of 4G network connections, the terminal checks 4G public land mobile networks (PLMN) and a tracking area (TA) to turn on a 5G modem upon detecting 5G area. The 5G modem searches for a 5G network periodically and performs 5G attach and PDN connection procedure when 5G network acquisition is successful.

The UE registers with two Cores (4G and 5G Core) independently and makes independent connections over 4G and 5G network, in order to minimize impact on legacy network. However, service is identified by an access point node (APN). When the UE requests the same APN to 4G and 5G simultaneously, the 4G and 5G core recognize it as the same service and allocate the same IP address to the UE for anchoring UE to the same 5G gateway.

Further, the 5G UE that supports 4G-5G interworking function has two non-access stratum (NAS) interfaces i.e., 4G NAS to communicate with a 4G mobile management entity (MME) and 5G NAS to communicate with 5G MME wherein these two interfaces work independently of each other.

When the 4G MME is requested to support a pre-defined APN for 5G service, it selects the 5G gateway (5G GW) instead of a legacy 4G serving gateway (4G SGW) and a 4G packet data network gateway (4G PGW) that have served legacy 4G UEs. The 4G MME is capable of selecting a one-box gateway that integrates SGW and PGW functions like 5G GW.

The 5G GW supports both 4G eNB and 5G gNB. They use the same interface S1-U, which is renamed as NG1-U in a 5G context. For 4G-5G interworking, 5G GW provides a link-switching function, which forwards downlink packets toward either a 4G eNB or a 5G gNB, and forwards uplink packets to a Gi interface regardless of whether the packets come from 4G eNB or 5G NB. The downlink selection is made based on signaling from UE.

The 5G terminal manages three PDNs such as an internet PDN, a 4G signaling PDN, and a 5G signaling PDN. In case of Internet PDN, the terminal activates the 4G internet PDN and the 5G internet PDN through 4G and 5G networks, respectively. In actual data communication, only one of two PDNs is selectively used according to the condition, and this is collectively referred to as internet PDN. The 5G terminal activates the 4G internet PDN and the 4G signaling PDN when connected to the 4G network. In order to simplify the operation scenario, the 4G signaling PDN is activated at the same time when the 4G internet PDN is activated regardless of whether the 5G venue is entered or not. 5G terminal shall activate 5G internet PDN and 5G signaling PDN when attached to 5G NW.

The 5G GW allocates the same internet protocol address to 4G internet PDN and 5G internet PDN for the same terminal for data interworking, and selectively uses one of two PDNs according to the specified scenario and the switching notification of the terminal during actual data communication.

Switching of data path from one RAT to another or deciding which path to choose for data transfer as per defined system leads to issues related to data and control planes which cannot be solved with the existing conventional system.

The above information is presented as background information only to help the reader to understand the present disclosure. Applicants have made no determination and make no assertion as to whether any of the above might be applicable as Prior Art with regard to the present application.

DISCLOSURE OF INVENTION

Technical Problem

An aspect of the present disclosure is to provide a method and system to handle Data and Control Plane issues in a 4G-5G interworking system.

Another aspect of the present disclosure is to address the detection and condition of retransmission of a link activation message.

Another aspect of the present disclosure is to provide a method to address non-receipt of a link switch message by a 5G gateway during 4G to 5G switching.

Another aspect of the present disclosure is to detect a 5G zone.

Another aspect of the present disclosure is to reduce power consumption of a user equipment during 4G-5G network switching.

Another aspect of the present disclosure is to avoid ping pong in 5G Border zone and unnecessary network signaling.

Another aspect of the present disclosure is to address different service (Internet) PDN IP addresses received by 4G and 5G networks.

Another aspect of the present disclosure is to address the UE and NW out of sync issues due to failure in 5G system.

Solution to Problem

In accordance with an aspect of the present disclosure, a method for managing inter network switching by a User Equipment (UE) in a wireless communication system. The method includes determining that the UE is in data communication with a first network, determining that a signaling packet data network (PDN) is established for transmitting a Link Switch Message (LSM) for the inter network switching during the data communication with the first network, performing a search for a second network when the signaling PDN is established for the first network and switching the data communication of the UE from the first network to the second network.

In accordance with another aspect of the present disclosure, the method includes a step to ignore to perform the search for the second network until the signaling PDN is established for the first network.

In accordance with another aspect of the present disclosure, switching the data communication of the UE from the first network to the second network further includes determining that radio conditions for the second network are better compared to radio conditions of the first network and transmitting the LSM to the second network through the signaling PDN.

In accordance with another aspect of the present disclosure, the method further includes determining that an acknowledgement message is received from a base station associated with the second network in response to transmitting the LSM to the second network, detecting that data is still received from the first network in response to determining that the acknowledgement is received, transmitting an indication for retransmission of the LSM message for switching to the second network and receiving the data from the first network before retransmitting the LSM for switching to the second network.

In accordance with another aspect of the present disclosure, an indication is transmitted to upper layers of the UE for retransmission of the LSM when data is being received from the first network.

In accordance with another aspect of the present disclosure, the uplink and downlink data communication with the first network is continuously retained.

In accordance with another aspect of the present disclosure, data is continuously received and transmitted over the first network until an acknowledgement of LSM and data is received over the second network.

In accordance with another aspect of the present disclosure, the method further includes determining that an acknowledgement message is not received from a base station associated with the second network in response to transmitting the LSM to the second network, detecting that data is received from the first network, detecting that a lower layer error occurs before receiving the acknowledgement message in response to transmitting the LSM to the second network, transmitting an indication for retransmission of the LSM message for switching to the second network and sending and receiving the data to and from the first network before retransmitting the LSM for switching to the second network.

Embodiments of the present disclosure provide a user equipment (UE) for managing a resource in a wireless communication system. The UE includes a memory, a processor and a resource controller communicatively coupled to the memory and the processor. The resource controller is configured for determining that the UE is in data communication with a first network, determining that a signaling packet data network (PDN) is established for transmitting a Link Switch Message (LSM) for the inter network switching during the data communication with the first network, performing a search for a second network when the signaling PDN is established for the first network and switching the data communication of the UE from the first network to the second network.

These and other aspects of the present disclosure will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This disclosure is illustrated in the accompanying drawings, throughout which like reference letters indicate corresponding parts in the various figures. The embodiments herein will be better understood from the following description with reference to the drawings, in which:

FIG. 4 is a flow diagram illustrating handling of Link Activation Message (LSM) by 4G system, according to an example embodiment;

FIG. 5 is a signaling diagram illustrating a condition when LSM is not received by a 5G Gateway (5G GW), according to an example embodiment;

FIG. 6 is a signaling diagram illustrating sending a notification to upper layers to retransmit the LSM, according to an example embodiment;

FIG. 7 is a flow diagram illustrating sending a notification to the upper layers of a lower layer error, according to an example embodiment;

FIG. 8 is a state diagram illustrating triggering of a service request, according to an embodiment;

FIG. 9 is a flow diagram illustrating if internet PDN IP given by 5G GW for 4G PDN and 5G PDN is the same, according to an example embodiment; and FIG. 10 is a flow diagram illustrating avoidance of frequent disruption arising out of moving in and out of a 5G network, according to an example embodiment.

Figure 1:
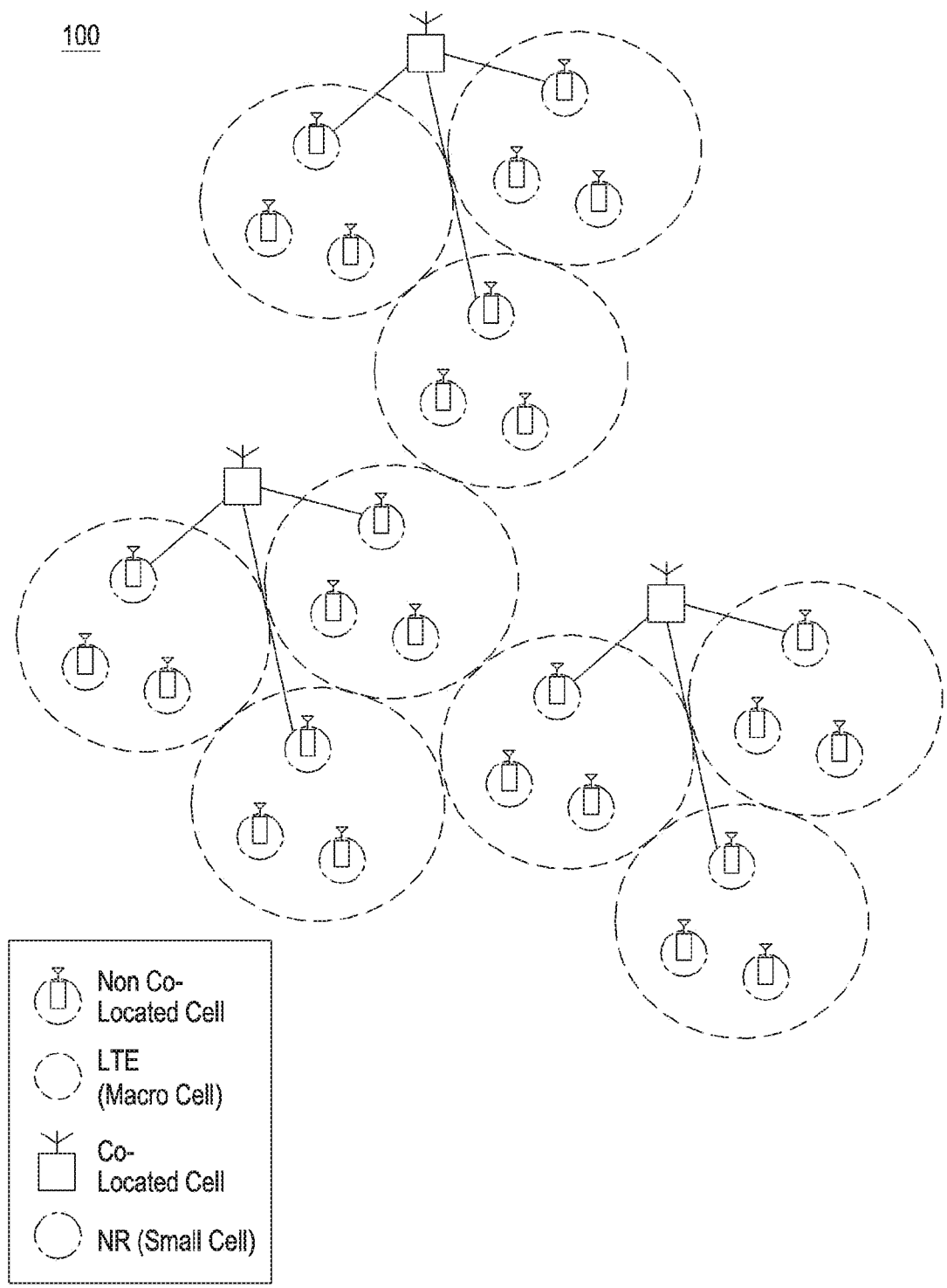
FIG. 1 illustrates a deployment scenario for a 4G-5G networks, according to an example embodiment.
Figure 2:
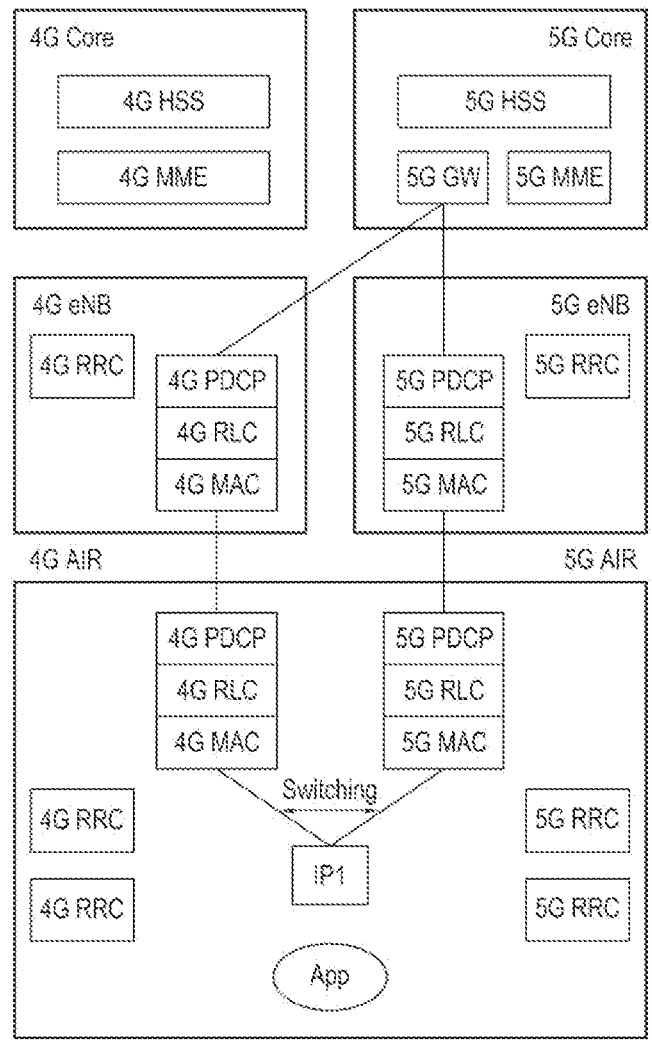
FIG. 2 illustrates 4G-5G interworking Standalone architecture, according to an example embodiment.

While embodiments of the present disclosure are described herein by way of example using several illustrative drawings, those skilled in the art will recognize the present disclosure is not limited to the embodiments or drawings described. It should be understood that the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

MODE FOR THE INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. Accordingly, the examples should not be construed as limiting the scope of the embodiments herein. Further it should be possible to combine the flows specified in different figures to derive a new flow.

Certain terms or phrases used herein may be defined merely for ease of description. As used herein, the terms "include" and "comprise" and their derivatives may indicate doing so without any limitations. As used herein, the term "or" may be used interchangeably with the term "and/or." As used herein, the phrases "associated with," "associated therewith" and their derivatives may be used interchangeably with the terms "include," "be included within," "interconnect with," "contain," "be contained within," "connect to or with," "couple to or with," "be communicable with," "cooperate with," "interleave," "juxtapose," "be proximate to, "be bound to or with, "have, and "have a property of." As used herein, the term "controller" may indicate any device, system, or part thereof controlling at least one operation. As used herein, the term "device" may indicate a device that may be implemented in hardware, firmware, software, and some combination of at least two thereof. It should be noted that functions, whatever certain controller is associated therewith, may be concentrated, distributed, and implemented locally or remotely. It should be appreciated by one of ordinary skill in the art that the definitions of certain terms or phrases as used herein may be adopted for the present or the future in many cases.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as "first" and "second" may be used to denote various components, but the components are not intended to be limited by the terms. The terms are used only to distinguish one component from another. For example, a first component may be referred to as a second component, and vice versa without departing from the scope of the present disclosure. The term "and/or" may refer to a combination(s) of a plurality of related items as listed or any of the items.

The terms as used herein are provided merely to describe embodiments of the present disclosure, but are not intended to limit the present disclosure. It will be further understood that the terms "comprise" and/or "have," when used in the present disclosure, indicate the presence of stated features, integers, steps, operations, elements, and/or components, but do not preclude the presence or addition of one or more other features, integers, steps, operations, elements, components, and/or groups thereof.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments disclosed herein are based on 5G MME however the embodiments are also applicable with 5G access management function (AMF).

Accordingly the embodiments herein is to provide embodiments disclosed herein provide a method for managing inter network switching by a User Equipment (UE) in a wireless communication system. The method includes determining that the UE is in data communication with a first network, determining that a signaling packet data network (PDN) is established for transmitting a Link Switch Message (LSM) for the inter network switching during the data communication with the first network, ignoring to perform a search for a second network until the signaling PDN is established for the first network and establishing the signaling PDN for the first network.

Referring now to the drawings and more particularly to FIGS. 3 through 10, where similar reference characters denote corresponding features consistently throughout the figure, there are shown preferred embodiments.

Figure 3:
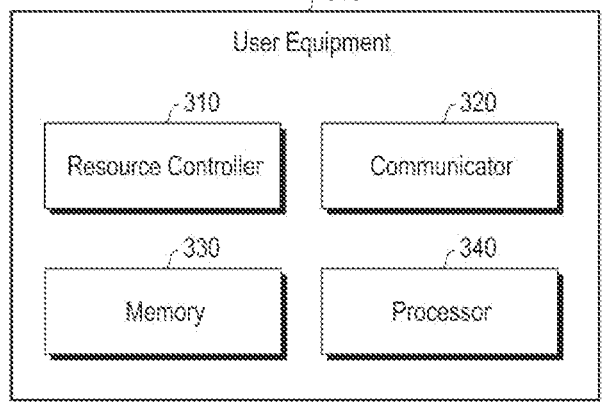
FIG. 3 is a block diagram illustrating various hardware components of a user equipment, according to an example embodiment.

FIG. 3 is a block diagram illustrating a user equipment 300 (UE 300), according to an embodiment. In an embodiment, the UE 300 includes a resource controller 310, a communicator 320, a memory 330 and a processor 340. The resource controller 310 is communicably coupled to the communicator 320, the memory 330 and the processor 340.

The processor 340 can be, but not restricted to, a Central Processing Unit (CPU), a microprocessor, or a microcontroller. The processor 340 is coupled to the memory 330, the communicator 320 and the resource controller 310. The processor 340 executes sets of instructions stored on the memory 160. The UE 300 may include at least one processor. The processor 340 may include at least one central processing unit (CPU). The communicator 320 may be a transceiver to transmit or receive data.

The memory 330 includes storage locations to be addressable through the processor 340. The memory 330 is not limited to a volatile memory and/or a non-volatile memory. Further, the memory 330 can include one or more computer-readable storage media. The memory 330 can include non-volatile storage elements. For example, non-volatile storage elements can include magnetic hard discs, optical discs, floppy discs, flash memories, or forms of electrically programmable memories (EPROM) or electrically erasable and programmable (EEPROM) memories. In various embodiments, the memory 330 stores a plurality of voice sets (hereinafter interchangeably used with voice prompts) from which the most relevant voice set is used to provide an interactive voice response to the user.

The resource controller 310 establishes a PDN connection over 5G/4G. The purpose is to exchange signaling messages needed for 4G-5G internetworking. The resource controller uses this PDN to send 5G/4G Link Activation Request message to a 5G GW. Whenever the resource controller 310 sends this Link Activation Request message on a specific RAT signaling APN, the 5G GW switches the data on that specific RAT. The switching condition of data from 3aone RAT to another is based on general parameters such as the received signal status and data reception rate etc.

The resource controller 310 connects to a 4G network first and on detecting 5G area it should establish the 5G signaling APN also, as defined above. The user data is always transmitted through the connected 4G internet PDN. When the state of the 5G NW in the 4G connected mode satisfies the switching condition, the resource controller 310 sends the 4G to 5G switching notification through 5G signaling PDN to the 5G GW after the 5G data bearer normally completes the setup and changes the data path of the terminal from the previous 4G modem to the 5G modem. When the 5G GW receives the notification, it changes the data path from the 4G internet PDN to the 5G internet PDN. In this case, the switching time of the core network and the resource controller 310 are not synchronized accurately and there is no data forwarding function between the 4G network and the 5G network, so data loss may occur during switching. However, the terminal can minimize the switching gap and data loss because the data service is available through the 4G NW during the setup of the 5G data bearer.

To activate the 5G connection, the resource controller 310 sends 5G LSM messages over a 5G link, so that 5G GW can switch the link from 4G to 5G. The resource controller sends this message repeatedly with some time interval because packets may be lost. Similarly, when the 5G radio link failure occurs or the 5G radio quality goes down below a threshold, the resource controller 310 makes a link switching decision for fallback to 4G. The resource controller 310 sends 4G link activation request messages over a 4G link, so that so that 5G GW can switch the link from 5G to 4G. The resource controller 310 always sends this message over the signaling APN whenever a switch from 4G to 5G or vice versa is made. The 5G GW silently discards repeated Link Activation Request message receptions.

FIG. 4 is a flow diagram illustrating handling of Link Activation Message (LSM) by 4G system. At step 402, the resource controller 310 establishes a 4G internet APN for data transfer after powering on the UE 300. At step 404, a 4G signaling APN is established to send an LSM and receives a keep alive message to retain RRC connection in the 4G network. The resource controller 310 checks if the 4G signaling APN us established at step 406. If the 4G signaling APN is not established, the resource controller 310 does not search for a 5G network as shown in step 408. In this scenario, the resource controller 310 is further directed to re-establish the 4G signaling APN to re-send the LSM. At step 410, once the 4G signaling APN is determined to have been established, a service request procedure is initiated.

FIG. 5 is a signaling diagram illustrating a condition when LSM is not received by a 5G Gateway (5G GW). At step 506, the UE 300 transmits data over 4G network to an eNodeB 502 (eNB 502). After the 4G signaling APN is established, the service request procedure is triggered. Accordingly, an LSM is transmitted to a 5G GW 504. Due to inaccuracies in timing, the LSM message may not be received. When an acknowledgement message is received at step 512, and if the LSM is not received the data path is still over the 4G network. In this scenario, downlink packets are transmitted over the 4G network at step 516 and uplink packets are transmitted over the 5G network at step 520. In both cases the packets are ignored by the UE 300 and the 5G GW respectively. As the uplink and downlink data gets discarded, this results in release of the RRC connection both with 4G and 5G networks. The UE 300 has to re-establishes the connection with the 4G network to an eNodeB 502 (eNB 502) which can cause unnecessary signaling, thereby causing high power consumption and latency issues.

FIG. 6 is a signaling diagram illustrating sending a notification to upper layers to retransmit the LSM. At step 602, the UE 300 transmits data over the 4G network to the eNB 502. After the 4G signaling APN is established, the service request procedure is triggered. Accordingly, an LSM is transmitted to a 5G GW 504. Due to inaccuracies in timing, the LSM message may not be received. The 5G GW 504 is directed to determine if the LSM message is received at step 606. Accordingly, a notification is sent to the upper layer to retransmit the LSM at step 610. Any data packets sent over the 4G link in the interim are retained and not discarded. Further the data path is still over the 4G network. The upper layers retransmit the LSM to the 5G GW. At step 614, an acknowledgement message is received by the UE 300. In this scenario, downlink packets and the uplink packets are transmitted over the 5G network at steps 616 and 618. In both cases the packets are successfully transmitted.

In various embodiments, the UE 300 retransmits the LSM in case of RLC unrecoverable error on data bearer on which UE sends Link Activation message, Radio link failure due to poor radio condition, RACH failure and a HO failure. In each of these cases, the UE 300 may lose the LSM due to reset of lower layers.

In all the above cases UE may not be able to receive an acknowledgement message (hereinafter referred to as "L2 ACK") as this procedure can cause reset at lower layers. It may also mean that the 5G GW 504 may have received the LSM but due to a change in cell or node, the 5G GW may not be able to transfer this message to a new node. In all these cases the UE 300 retransmits the LSM.

In various embodiments, data can be running in 4G RAT and switching condition satisfies a network switch from 4G to 5G. The UE 300 sends the LSM to the 5G GW. In this case it may happen that the UE 300 on receiving the L2 ACK for this message switch the path to 5G, but 5G GW may not have received this message due to some temporary NW issue. In this case when the UE 300 switches the data path to the 5G network, ideally data at 4G side should stop. In the event that the UE 300 detects that data is still coming on 4G, it stops the ongoing data in uplink on 5G and retransmits the LSM, so that the 5G GW 504 switch the downlink data path to 5G RAT.

In another embodiment, if the lower layer notifies about the failure of transfer of this message through signaling bearer, the lower layer informs the upper layers and initiates the transfer of this message again. Alternatively, the UE 300 can also check the 4G to 5G switching condition once again to take the decision whether it want to transmit the data over 4G or want to switch to the 5G network.

In another embodiment, consider data is running in the 4G RAT and the switching condition satisfies from the 4G network to the 5G network, the UE 300 sends the LSM to the 5G GW 504. In this case it may happen that the UE 300 on getting the L2 ACK for the LSM, switches the data path to the 5G network, but the 5G GW 504 may not have received this message due to some temporary networking issue. In this case data path is still over the 4G RAT, so whatever data is being transferred in uplink it may be discarded at the network side and the UE 300 may not get the response of uplink data. Once the lower layers detect this it can send an indication to the upper layers to initiate the transfer of this message again. Alternatively, the UE 300 can also check the 4G to 5G switching condition once again to take the decision whether data is to be transmitted over 4G or a switch is to be made over 5G.

In all of the above listed cases, if the UE 300 does not receive any L2 ACK, then it retransmits the LSM. The number of retransmissions and the period between each retransmission is configurable at the UE 300. The above listed method is valid for 4G as well as 5G RAT.

In an embodiment, if a signaling APN bearer is in unacknowledged mode, the module that initiates the LSM should take care of retransmission of the LSM on detection of above cases. Once to the LSM is transmitted to the lower layers, a pre-defined timer is initiated. Once the pre-defined timer expires, any of the above cases or any notification from lower layers is detected. Upon detection, the LSM is re-transmitted.

FIG. 7 is a flow diagram illustrating sending a notification to the upper layers of a lower layer error, according to an embodiment. At step 702, the upper layers perform a 4G to 5G switch. The LSM is triggered by the upper layers and a timer is started at step 704. The UE 300 receives the L2 ACK for the LSM transmitted at step 706. If the L2 ACK is not received, the upper layers are informed to retransmit the LSM at step 708. If the L2 ACK is received, the UE 300 switch the data path to the 5G RAT. At step 712, the lower layers transmit a notification to the upper layers over receiving no response for uplink data transmission. If there is no notification, the data is continued in 5G at step 714. If there is a notification, the upper layers are accordingly notified.

FIG. 8 is a state diagram 800 illustrating triggering of a service request, according to an embodiment as disclosed herein. The UE 300 triggers the service request in 5G systems in any or a combination of events such as but limited to during triggering of new data from the upper layers, during 4G to 5G data switching (In case the 5G network is in better radio condition) as shown at step 802. If the SR request is not successful, as shown in step 804, in 5G networks, then the UE 300 resets the 5G Retry timer and starts the 5G Retry timer. When the retry timer is expired at step 806, the 5G network is disconnected, and the 4G radio resource control (RRC) and a 5G measurement result is checked at step 808. The service request is retriggered and the retry timer is reset.

The 5G GW does not receive link switching message during 4G to 5G switching. The 5G GW that does not receive link switching message sends user data to 4G modem through 4G signaling PDN and terminal that has already changed the data path to 5G discards the data received through 4G signaling PDN.

In addition, the user data sent by the UE 300 is also discarded in the 5G GW. As a result, 5G RRC is released as there is no user data through 5G, and the terminal changes the data path to 4G by falling back to 4G. In case of 5G GW, data path is restored without additional action because the data path is maintained to 4G.

In conventional art, downlink data is discarded at 4G UE although it received the same successfully. Uplink data is sent by 5G which is discarded at the 5G network. In such a scenario, the UE 300 re-initiates the switching procedure in its entirety which is expensive and results in loss of resources.

In an embodiment, after having sent the 4G to 5G link activation message via the 5G network, in case the 4G stack detects that downlink data is still transmitted on the 4G network, it sends a notification to the 5G stack to retransmit the LSM.

The received downlink data at the 4G stack is not discarded when the 5G stack is doing the retransmit of the Link Activation message.

In various embodiments, the 4G stack sends the received downlink data packets to the 5G stack and the 5G stack sends them to an access point (AP). Here it is considered that the AP side having received the link switching message keeps the 4G data path (example RMNET interface connected to 4G) active until it starts receiving downlink data packets on the 5G data path.

Uplink data from the AP received at the 5G stack is buffered when the link activation message is being retried (re-transmitted) by the 5G stack. Those uplink packets are sent out after link activation is successful.

If the UE 300 has already changed the data path to 5G and sent the LSM to the 5G GW 504, but the 5G GW 504 does not receive the message. The 5G GW continuously transmits data packets over 4G. In this case, the UE 300 recognizes that the 5G GW 504 has not received the link switching message, and resends the link switching message to resolve the corner case. The UE should sent these received data packets over 4G link to AP either by 4G stack itself or through 5G stack.

The module in which the above concept is implemented can differ as per implementation. For example PDCP, Above PDCP, AP RIL, AP Linux Kernel or common data buffer/services management module which can interact with both 4G as well as 5G stacks.

After the L2 ACK is received for the Link activation message, the 5G stack can send the request (example ICMP ping) (over the DRB for Service PDN) to pre-defined server and check if the ping response is received. If the response is received for the request then it mean that Link activation was not lost at the 5G GW 504 and was successfully processed at the 5G GW and path switched.

In an embodiment, if the response is not received then link activation message is re-transmitted (based on the implementation defined counter for the link activation message re-transmission).

In case the UE 300 does not receive the L2 ACK for the data it is sending for a pre-defined time, it retransmits the LSM (can be based on the implementation defined counter for the link activation message re-transmission).

The above concepts in a similar way can be applied at the UE 300 to handle the error cases during the 5G to 4G link switch as well.

In an embodiment, the UE 300 detects a 5G zone where 5G radio services can be provided. The 5G zone is identified by a specific Public Land Mobile Network (PLMN) ID that is broadcast over the 4G network.

In an embodiment, the UE 300 may be under border condition as shown in FIG. 1, and in such cases the UE 300 may not power on the 5G stack and perform the 5G cell search unless it reselects to the cell which broadcasts the 5G PLMN ID. This may lead to delay in the 5G stack start and providing the 5G services to the UE applications.

In an embodiment, whenever the UE 300 detects the 5G PLMN in a certain 4G cell it keeps the mapping and remembers that the corresponding 4G TA falls under 5G coverage or has high likelihood of 5G services.

Next time when the UE is camped on the LTE cell in a certain TA and UE has previous stored information that this TA falls under the 5G coverage then it immediately starts the 5G stack and tries to do the 5G PLMN and cell search even if the currently camped 4G cell's system information block (SIB) is not broadcasting the 5G PLMN ID. This helps in the faster detection of the 5G zone by the UE.

In various embodiments, the UE 300 may also power on the 5G stack based on the geographical location, GPS coordinates where earlier it had found the 5G cell. This mapping may be dynamically managed by the UE 300. For example, the mapping is deleted after certain implementation specific duration or when it cannot find the 5G services via the table even though earlier it was successful.

In various embodiments, the UE 300 detects a 5G zone where 5G radio services can be provided. The 5G zone is identified by a specific PLMN ID that is broadcast over the 4G network. In case the UE 300 is camped on an LTE cell, the UE 300 stores the pre-defined PLMN ID and always monitors SIB messages being broadcast from LTE cells. Until the 5G PLMN is not detected, the 5G modem is off.

The UE 300 can do a background public land mobile network (BPLMN) scan to detect the 5G PLMN. The UE 300 can periodically power on the 5G Radio to detect the 4G cell carrying the 5G PLMN. This periodicity can be configurable at the UE 300.

In various embodiments, the UE 300 is in border area of 5G zone and moving in and out of the 5G zone. So as per the current specs/requirements whenever the UE 300 moves out of 5G zone then the 4G stack triggers the 5G stack to perform a Signaling PDN Deactivation procedure, a Service PDN Deactivation procedure and a Detach procedure If the UE 300 frequently moves in and out of the 5G zone frequently, more signaling load issues occur on the network. When the UE detects that it is out of 5G zone then it will not immediately trigger the 5G stack for the PDN disconnect and Detach procedure. The resource controller 310 waits for a specific period to check if the UE 300 is coming back to 5G zone. If UE detects that it has come back to the 5G zone before the expiry of the above mentioned time period, then the UE 300 does not need to re-attach and activate the PDN.

In various embodiments, the time period can be a fixed value or it can be dynamic based on the usage of the UE 300 based on moving pattern for in and out of 5G zone. Timer X can be a configurable operator parameter which is changeable via OTA message.

FIG. 9 is a flow diagram illustrating if the internet PDN IP given by 5G GW for 4G PDN and 5G PDN is the same, according to an embodiment as disclosed herein. At step 902, the UE 300 is connected with an Internet PDN and a 4G signaling PDN. At step 904, the uplink and downlink services are initiated on the 4G network. When the UE 300 enters a 5G cell, the upper layers decide to switch data from 4G to 5G at step 906. At step 908, the UE 300 checks if the Internet PDN IP given by the 5G GW for 4G PDN and 5G PDN is same In various embodiments, in case of any error or abnormal situations, the UE 300 receives a different IP on 4G and 5G. The UE 300 keeps the data transfer on 4G only until error situation is recovered.

FIG. 10 is a flow diagram illustrating avoidance of frequent disruption arising out of moving in and out of a 5G network, according to an embodiment as disclosed herein. At step 1002, the UE 300 is detected to be connected to both 4G and 5G modes. The data service is performed on 5G. At step 1006, when the UE 300 is detected be out of the 5G cell, a timer is started. The timer measures a waiting time before the UE 300 is detached from the 5G signaling PDN at step 1014.

Various embodiments can be implemented through at least one software program running on at least one hardware device and performing network management functions to control the elements. The elements shown in FIGS. 1A-8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for switching data communication by a user equipment (UE) in a wireless communication system, the method comprising:
   performing data communication with a first network;
   establishing a signaling packet data network (PDN) with the first network, while performing the data communication with the first network;
   performing a search for a second network if the signaling PDN is established with the first network;
   identifying whether radio conditions for the second network are better than radio conditions of the first network;
   transmitting a link switch message (LSM) to the second network through the signaling PDN, if the radio conditions for the second network are better than the radio conditions of the first network;
   if an acknowledgement message is received from a base station associated with the second network in response to transmitting the LSM to the second network, switching the data communication of the UE from the first network to the second network; and
   if an indication for retransmission of the LSM is received from the second network in response to transmitting the LSM to the second network, receiving the data from the first network before retransmitting the LSM for switching to the second network,
   wherein the indication for retransmission of the LSM is transmitted from the second network if the base station does not receive the LSM or if the first network detects that the data is transmitted to the UE through the first network after the LSM is transmitted to the second network.

2. The method of claim 1, wherein the indication is transmitted to upper layers of the UE for retransmission of the LSM while data is being received from the first network.

3. The method of claim 1, wherein the data from the first network is continuously received and retained.

4. The method of claim 3, wherein data is continuously received and transmitted over the first network until the acknowledgement of LSM and data is received over the second network.

5. A user equipment (UE) for switching data communication in a wireless communication system, comprising:
   a memory; and
   at least one processor coupled to the memory, wherein the at least one processor is configured to:
   perform data communication with a first network;
   establish a signaling packet data network (PDN) with the first network, while performing the data communication with the first network;
   perform a search for a second network if the signaling PDN is established with the first network; and
   identify that radio conditions for the second network are better compared to the first network; and
   transmit a link switch message (LSM) to the second network through the signaling PDN, if the radio conditions for the second network are better than the radio conditions of the first network;
   if an acknowledgement message is received from a base station associated with the second network in response to transmitting the LSM to the second network, switch the data communication of the UE from the first network to the second network; and
   if an indication for retransmission of the LSM is received from the second network in response to transmitting the LSM to the second network, receive the data from the first network before retransmitting the LSM for switching to the second network,
   wherein the indication for retransmission of the LSM is transmitted from the second network if the base station does not receive the LSM or if the first network detects that the data is transmitted to the UE through the first network after the LSM is transmitted to the second network.

6. The UE of claim 5, wherein the indication is transmitted to upper layers of the UE for retransmission of the LSM while data is being received from the first network.

7. The UE of claim 5, wherein the data from the first network is continuously received and retained.

8. The UE of claim 7, wherein data is continuously received and transmitted over the first network until the acknowledgement of LSM and data is received over the second network.

* * * * *